United States Patent
Qiu et al.

(10) Patent No.: US 10,764,018 B2
(45) Date of Patent: **\*Sep. 1, 2020**

(54) METHOD AND APPARATUS FOR PROCESSING ACTIVATION/DEACTIVATION OF INTER-ENODEB CARRIER AGGREGATION

(71) Applicant: Samsung Electronics Co., Ltd., Suwon-si, Gyeonggi-do (KR)

(72) Inventors: Yu Qiu, Beijing (CN); Lixiang Xu, Beijing (CN); Xiaowan Ke, Beijing (CN); Hong Wang, Beijing (CN)

(73) Assignee: Samsung Electronics Co., Ltd., Suwon-si (KR)

( \* ) Notice: Subject to any disclaimer, the term of this patent is extended or adjusted under 35 U.S.C. 154(b) by 0 days.

This patent is subject to a terminal disclaimer.

(21) Appl. No.: 16/537,883

(22) Filed: Aug. 12, 2019

(65) Prior Publication Data

US 2019/0363861 A1    Nov. 28, 2019

Related U.S. Application Data

(63) Continuation of application No. 16/193,821, filed on Nov. 16, 2018, now Pat. No. 10,382,183, which is a
(Continued)

(51) Int. Cl.
*H04L 5/00* (2006.01)
*H04W 16/32* (2009.01)
*H04W 92/20* (2009.01)

(52) U.S. Cl.
CPC ............ *H04L 5/0098* (2013.01); *H04L 5/001* (2013.01); *H04W 16/32* (2013.01); *H04W 92/20* (2013.01)

(58) Field of Classification Search
CPC ...... H04L 5/001; H04L 5/0098; H04W 16/32; H04W 92/20
(Continued)

(56) References Cited

U.S. PATENT DOCUMENTS

| | | |
|---|---|---|
| 2011/0134774 A1 | 6/2011 | Pelletier et al. |
| 2012/0176926 A1 | 7/2012 | Jang et al. |

(Continued)

FOREIGN PATENT DOCUMENTS

| | | |
|---|---|---|
| CN | 102668412 A | 9/2012 |
| CN | 102932951 A | 2/2013 |

OTHER PUBLICATIONS

International Search Report dated Apr. 27, 2015 in connection with International Patent Application No. PCT/KR2015/000990, 3 pages.
(Continued)

*Primary Examiner* — Timothy X Pham

(57) ABSTRACT

The present invention relates to the technical field of radio communications, and particularly to a method and apparatus for processing activation/deactivation of inter-eNodeB carrier aggregation. Embodiments of the present invention provide a method for processing activation/deactivation of inter-eNodeB carrier aggregation, comprising the steps of: receiving, by UE, an MAC CE for activation/deactivation of an SCell sent by a master eNodeB or a secondary eNodeB; determining, by the UE, the corresponding SCell; and performing, by the UE, activation/deactivation to the corresponding SCell according to the indication information in the MAC CE for activation/deactivation.

16 Claims, 8 Drawing Sheets

Related U.S. Application Data continuation of application No. 15/115,629, filed as application No. PCT/KR2015/000990 on Jan. 29, 2015, now Pat. No. 10,205,582.

(58) Field of Classification Search
USPC .......................................................... 455/449
See application file for complete search history.

(56) References Cited

U.S. PATENT DOCUMENTS

| | | |
|---|---|---|
| 2013/0250881 A1 | 9/2013 | Liao et al. |
| 2015/0092707 A1 | 4/2015 | Kwon |
| 2015/0146692 A1 | 5/2015 | Yi et al. |
| 2015/0156764 A1 | 6/2015 | Yang et al. |
| 2015/0215926 A1 | 7/2015 | Huang et al. |
| 2015/0230221 A1 | 8/2015 | Kim et al. |
| 2016/0100345 A1 | 4/2016 | Thangarasa et al. |
| 2016/0255577 A1 | 9/2016 | Kazmi et al. |
| 2016/0323865 A1 | 11/2016 | Kwon et al. |
| 2017/0041880 A1 | 2/2017 | Ouchi et al. |
| 2017/0048734 A1 | 2/2017 | Kusashima et al. |
| 2017/0055242 A1 | 2/2017 | Kusashima et al. |
| 2017/0105179 A1 | 4/2017 | Kusashima et al. |

OTHER PUBLICATIONS

Written Opinion of the International Searching Authority dated Apr. 27, 2015 in connection with International Patent Application No. PCT/KR2014/000990, 6 pages.

Samsung, "Activation and Deactivation for Inter-ENS CA", 3GPP TSG RAN WG2 #84, R2-133824, Nov. 11-15, 2013, San Francisco, CA, 4 pages.

Huawei, et al., "Activation and Deactivation of Cells on SeNB", 3GPP TSG RAN WG2 Meeting #84, R2-134272, Nov. 11-15, 2013, San Francisco, CA, 3 pages.

Intel Corporation, "SCell Activation/Deactivation for Dual Connectivity", 3GPP TSG RAN WG2 Meeting #84, R2-134277, Nov. 11-15, 2013, San Francisco, CA, 3 pages.

Catt, "Small Cell Activation and Deactivation", 3GPP TSG RAN WG2 Meeting #84, R2-134060, 2 pages.

The State Intellectual Property Office of People's Republic of China, "First Office Action," Application No. CN 201410043678.8, Oct. 31, 2018, 13 pages.

ZTE, "Discussion on activation and deactivation MAC CE," R2-106330, 3GPP TSG-RAN WG2 Meeting #72, Jacksonville, USA, Nov. 15-19, 2010, 4 pages.

METHOD AND APPARATUS FOR PROCESSING ACTIVATION/DEACTIVATION OF INTER-ENODEB CARRIER AGGREGATION

CROSS-REFERENCE TO RELATED APPLICATIONS

This application is a continuation of application Ser. No. 16/193,821, filed Nov. 16, 2018, which is a continuation of application Ser. No. 15/115,629, which is the National Stage of International Application No. PCT/KR2015/000990, filed Jan. 29, 2015, now U.S. Pat. No. 10,205,582, which claims priority to Chinese Patent Application No. 201410043678.8, filed Jan. 29, 2014, the disclosures of each are incorporated herein by reference into the present disclosure as if fully set forth herein.

BACKGROUND

1. Field

The present invention relates to the technical field of radio communications, and particularly to a method and apparatus for processing activation/deactivation of inter-eNodeB carrier aggregation.

2. Description of Related Art

In order to make the LTE-Advanced reach 1 Gbps of downlink rate and 500 Mbps of uplink rate and also make full use of various scattered frequency bands, the carrier aggregation (CA) has been introduced in 3GPP Release 10 (Rel-10). By aggregating at most five 20 MHz component carriers (CC) to allow the system bandwidth to reach 100 MHz, the requirements of rate are satisfied. The cell of a primary component carrier (PCC) is a primary cell (Pcell), and the cell of a secondary component carrier (SCC) is a secondary cell (Scells). All Scells are added, modified and removed via RRC reconfiguration messages by a serving eNodeB of UE, where an RRC information element added with a secondary cell, as shown below, includes secondary cell index (ScellIndex), physical cell identifier of the secondary cell and downlink carrier frequency:

```
SCellToAddMod-r10 ::=   SEQUENCE {
    sCellIndex-r10          SCellIndex-r10,
    cellIdentification-r10  SEQUENCE {
        physCellId-r10          PhysCellId,
        dl-CarrierFreq-r10      ARFCN-ValueEUTRA
    }                                           OPTIONAL,   -- Cond SCellAdd
```

Compared with Release 8 (Rel-8), the introduction of the multi-carrier aggregation also brings about larger power consumption of user equipment (UE). To further reduce the power consumption of UE, in Rel-10, other than the previous discontinuous reception (DRX), quick activation and deactivation solutions for secondary cells are also introduced.

When a secondary cell is deactivated, UE does not monitor the physical downlink control channel (PDCCH) information of the cell and also does not transmit data in this cell. Meanwhile, the UE does not perform for this cell measurement of channel state information (CSI) (the measurement of a downlink common reference signal still needs to be performed).

Both activation and deactivation are controlled by an eNodeB. As shown in FIG. 1, a schematic diagram of the format of an MAC CE for quick activation and deactivation of a secondary cell is shown. By sending an 8-bit MAC control element (MAC CE), an eNodeB controls the activation and deactivation of one or more SCells, where Ci indicates whether a serving cell i is to be activated; if Ci is set to be 1, it is indicated that the serving cell i needs to be activated, and if Ci is set to be 0, it is indicated that the serving cell i needs to be deactivated; and, R is a reserved bit. If no PDCCH message or data is received from an activated secondary carrier within a time period set by a deactivation timer, the UE may deactivate a certain SCell actively. Of course, the eNodeB may configure the deactivation timer as "infinite" to prevent the UE from deactivating a certain SCell actively.

In 3GPP Release 12 (Rel-12), the requirements of small cell enhancement (SCE) are proposed. Target scenarios for small cell enhancement include scenarios covered by macrocells, scenarios not covered by macrocells, indoor scenarios, outdoor scenarios, and enhanced scenarios with ideal and non-ideal backhaul, as shown in FIG. 2.

A macro eNodeB serves as the master eNodeB of UE, while a small cell eNodeB serves as the secondary eNodeB of the UE. The macrocells and the small cells may work on different frequency bands. In a case of the coverage of a macrocell, inter-eNodeB carrier aggregation (Inter-eNodeB CA) may be employed, where the primary component carrier (PCC) can be located in the master eNodeB only. According to the consensuses made in the 3GPP meeting, both the master eNodeB and the secondary eNodeB have the capability of independent scheduling and the capability of independent physical uplink control channel (PUCCH) transmission, and both the master eNodeB and the secondary eNodeB can aggregate more than one component carrier, i.e., intra-eNodeB carrier aggregation compatible in Rel-10. All cells serving the UE under each eNodeB are called a cell group (CG), all cells serving the UE under a master eNodeB are called a master cell group (MCG), while all cells serving the UE under a secondary eNodeB are called a secondary cell group (SCG).

Through the discussions in the study item (SI) phase, the inter-eNodeB carrier aggregation inherits the characteristics of the intra-eNodeB carrier aggregation. Each UE may have at most five serving cells, i.e., five component carriers. The addition and removal of all component carriers are executed by the master eNodeB. For the activation and deactivation of a secondary cell, the following consensuses or agreements have been reached in the SI phase: 1) cells in an SCG support activation and deactivation; 2) the master eNodeB takes charge of the activation and deactivation of cells in an MCG, while the secondary eNodeB takes charge of the activation and deactivation of cells in an SCG; and 3) an SCell added firstly in an SCG has the capability of PUCCH transmission, and this cell is always in the activated state.

SUMMARY

Based on the above agreements, during inter-eNodeB carrier aggregation, there will be the following problems: When UE receives MAC CEs for activation/deactivation from a master eNodeB and a secondary eNodeB, with the MAC CEs from the two eNodeBs having the same format, if there are different values at the same bit position of the two MAC CEs, the UE will be unaware that which operation is to be done to the corresponding Scell.

Therefore, it is necessary to provide effective technical solutions to solve the problems of high misinterpretation rate caused when UE receives MAC CEs for activation/deactivation from different eNodeBs and low accuracy of activation/deactivation operation in the scenario of inter-eNodeB carrier aggregation.

To achieve the above object, one aspect of embodiments of the present invention provides a method for processing activation/deactivation of inter-eNodeB carrier aggregation, comprising the steps of: receiving, by UE, an MAC CE for activation/deactivation of an SCell sent by a master eNodeB or a secondary eNodeB; determining, by the UE, the corresponding SCell; and performing, by the UE, activation/deactivation to the corresponding SCell according to the indication information in the MAC CE for activation/deactivation.

Another aspect of the embodiments of the present invention further provides an apparatus for processing activation/deactivation of inter-eNodeB carrier aggregation, comprising a receiving module, an analysis module and a processing module, the receiving module is configured to receive an MAC CE for activation/deactivation of an SCell sent by a master eNodeB or a secondary eNodeB; the analysis module is configured to determine the corresponding SCell; and the processing module is configured to perform activation/deactivation to the corresponding SCell according to the indication information in the MAC CE for activation/deactivation.

An object of the present invention is to at least solve one of the above technical defects. Particularly, by using available SCellIndex in the eNodeB with respect to SCells of different cell groups when a master eNodeB adds SCells, in the scenario of inter-eNodeB carrier aggregation, the high misinterpretation rate, caused when UE receives MAC CEs for activation/deactivation from different eNodeBs, may be effectively decreased, so that the accuracy and effectiveness of activation/deactivation are ensured, and the manner of activation/deactivation of intra-eNodeB carrier aggregation (conventional carrier aggregation) is compatible.

BRIEF DESCRIPTION OF DRAWINGS

These and/or further aspects and advantages of the present invention will become apparent from and be more readily appreciated from the following descriptions of embodiments taken with reference to the drawings. In the drawings.

DETAILED DESCRIPTION

By the above solutions provided by the present invention, by using available SCellIndex in the eNodeB with respect to SCells of different cell groups when a master eNodeB adds SCells, in the scenario of inter-eNodeB carrier aggregation, the manner of activation/deactivation of intra-eNodeB carrier aggregation is compatible, and meanwhile the high misinterpretation rate, caused when UE receives MAC CEs for activation/deactivation from different eNodeBs, may be effectively decreased, so that the accuracy and effectiveness of activation/deactivation are ensured. By the above solutions provided by the present invention, few changes are required to be done to an existing system, so that the compatibility of the system will not be influenced and the implementation is simple and efficient.

Additional aspects and advantages of the present invention will be partially given in the following descriptions. These aspects and advantages will become apparent from the following descriptions or be appreciated from the practices of the present invention.

Embodiments of the present invention shall be described in detail hereafter. The examples of the embodiments shall be illustrated by the accompanying drawings, wherein similar or same numeral symbols indicate similar or same elements or elements with same or similar functions. The embodiments described with reference to the drawings are intended to explain the present invention and should not be construed as any limitation to the present invention.

The core idea of the present invention is: in a scenario of inter-eNodeB carrier aggregation, MAC CEs for activation/deactivation of an SCell from a master eNodeB and a secondary eNodeB will make UE confused, as a result, the UE may mistakenly activate/deactivate a certain SCell. The solutions of the present application may effectively solve the above problem and make the operation of activation/deactivation of an SCell during inter-eNodeB carrier aggregation more accurate and effective.

In the present invention, symbol "/" may be interpreted as 'and' or 'or' according to the context.

Figure 3:
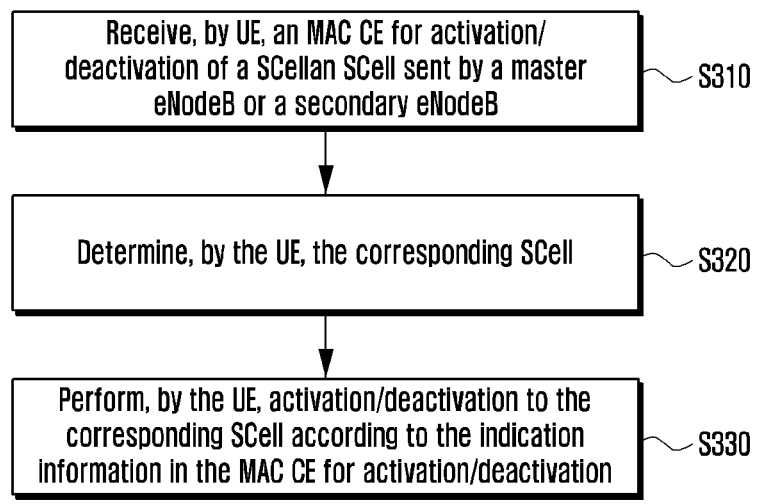
FIG. 3 is a flowchart of a method for processing activation/deactivation of inter-eNodeB carrier aggregation according to an embodiment of the present invention.

As shown in FIG. 3, a flowchart of a method for processing activation/deactivation of inter-eNodeB carrier aggregation according to an embodiment of the present invention is shown. The method for processing activation/deactivation of inter-eNodeB carrier aggregation provided by the embodiment of the present invention includes the steps of:

S310: receiving, by UE, an MAC CE for activation/deactivation of an SCell sent by a master eNodeB or a secondary eNodeB;

S320: determining, by the UE, the corresponding SCell; and

S330: performing, by the UE, activation/deactivation to the corresponding SCell according to the indication information in the MAC CE for activation/deactivation.

In the above embodiment of the present invention, the UE performs activation or deactivation to the corresponding SCell according to the indication information in the MAC CE for activation/deactivation. In the scenario of inter-eNodeB carrier aggregation, the manner of activation/deactivation during conventional carrier aggregation may be compatible and the high misinterpretation rate caused when UE receives MAC CEs for activation/deactivation from different eNodeBs may be effectively decreased, so that the accuracy and effectiveness of activation/deactivation are ensured.

S310 to S330 will be described in details as below with reference to specific embodiments.

S310: UE receives an MAC CE for activation/deactivation of an SCell sent by a master eNodeB or a secondary eNodeB.

S320: The UE determines the corresponding SCell.

As an embodiment of the present invention, the UE determines an eNodeB controlling the corresponding SCell according to the indication information in the MAC CE for activation/deactivation, and then determines the corresponding SCEll according to the eNodeB controlling the corresponding SCell.

Further, the determining an eNodeB controlling the corresponding SCell according to the indication information in the MAC CE for activation/deactivation includes:

determining the eNodeB controlling the corresponding SCell according to a bit position of the indication information.

The above embodiment will be described as below with reference to a specific application scenario.

Application Scenario 1 (Solution A):

Introduction of this Solution

The allocation rules of SCellIndexes are predetermined, for example, which SCellIndex is to be used by a master eNodeB and which SCellIndex is to be used in a secondary eNodeB. Accordingly, the UE may be aware of, when receiving an MAC CE for activation/deactivation from the master eNodeB or the secondary eNode, the bit position of the MAC CE to be separately read in the master eNodeB or the secondary eNodeB, and then perform activation/deactivation to the corresponding SCell according the read bit position.

Figure 4:
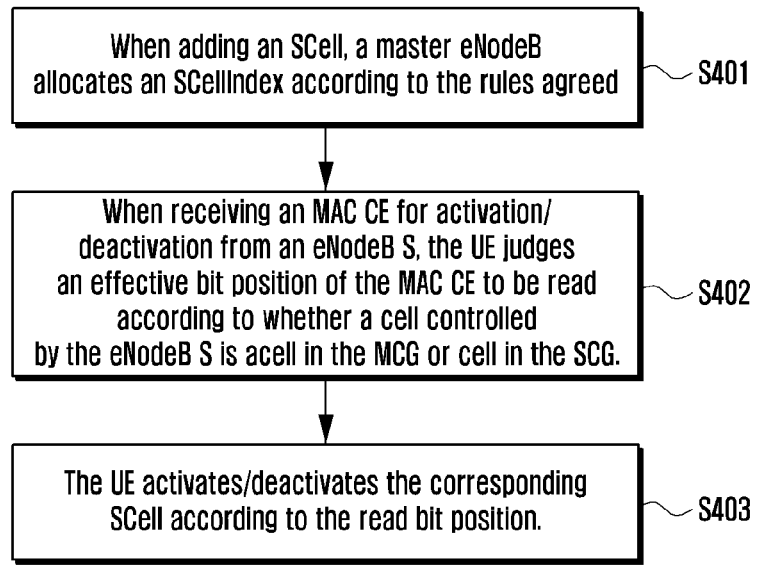
FIG. 4 is a flowchart of a solution A for activation/deactivation of inter-eNodeB carrier aggregation according to the present invention.

As shown in FIG. 4, a flowchart of a solution A for activation/deactivation of inter-eNodeB carrier aggregation according to the present invention is shown. This solution specifically includes the following steps:

S401: When adding an SCell, a master eNodeB allocates an SCellIndex according to the rules agreed.

For example, the master eNodeB allocates SCellIndex {1, 2, 3, 4} to SCells in the MCG and SCellIndex {5, 6, 7} to SCells other than pSCell in the SCG.

When sending an MAC CE to the UE, the master eNodeB sets the corresponding bit position of SCells controlled by this master eNodeB according to practical conditions, while sets the corresponding bit position of SCells controlled by a secondary eNodeB to be a default value, for example 0. When sending an MAC CE to the UE, the secondary eNodeB sets the corresponding bit position of SCells controlled by this secondary eNodeB according to practical conditions, while sets the corresponding bit position of SCells controlled by the master eNodeB to be a default value, for example 0.

S402: When receiving an MAC CE for activation/deactivation from an eNodeB S, the UE judges an effective bit position of the MAC CE to be read according to whether a cell controlled by the eNodeB S is a cell in the MCG or cell in the SCG.

Here, the eNodeB S may be a master eNodeB or a secondary eNodeB.

This step further includes: the UE judges, according to whether a cell controlled by the eNodeB S is a cell in the MCG or cell in the SCG, whether the effective bit position controlled by the eNodeB S belongs to {C1, C2, C3, C4} or {C5, C6, C7}, and then determines the effective bit position to be read, in combination with the SCellIndex of an SCell in this eNodeB.

For example, if the eNodeB S is a secondary eNodeB, the bit position read by the UE belongs to {C5, C6, C7}, and then the UE may judge that the effective bit position to be read is {C5, C6} according to the SCellIndex {5, 6} of the secondary eNodeB.

S403: The UE activates/deactivates the corresponding SCell according to the read bit position.

Specifically, the UE activates/deactivates an SCell having a corresponding index {m, n, . . . } according to the indication of {Cm, Cn, . . . }.

As an embodiment of the present invention, after acquiring an SCellIndex and a corresponding cell group of an SCell, the UE determines the corresponding SCell according to the SCellIndex, the corresponding cell group and the indication information in the MAC CE for activation/deactivation.

Further, the acquiring, by the UE, an SCellIndex and a corresponding cell group of an SCell includes:

acquiring, by the UE, the SCellIndex and the corresponding cell group of the SCell when receiving SCell addition information sent by the master eNodeB.

The above embodiment will be described as below with reference to a specific application scenario.

Application Scenario 2 (Solution B):

Introduction of this Solution

An eNodeB informs, when adding an SCell, the UE of information about a cell group/eNodeB of the SCell. Then, the UE directly reads, when receiving an MAC CE for activation/deactivation, the bit position corresponding to the subordinate SCell of the eNodeB from which the MAC CE is sent, and then activates/deactivates the related SCell. The master cell group MCG is corresponding to a master eNodeB, and the secondary cell group SCG is corresponding to a secondary eNodeB.

Figure 5:
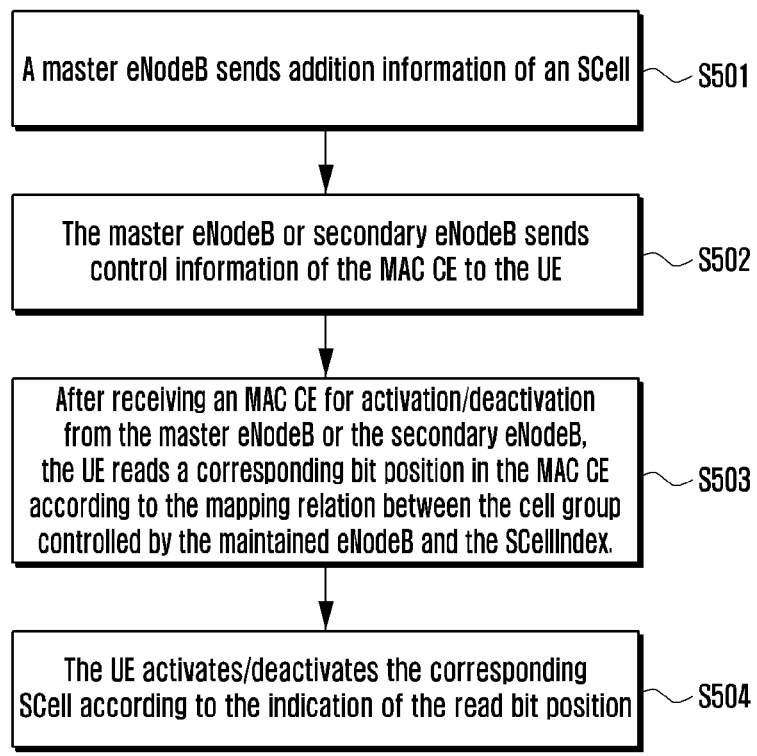
FIG. 5 is a flowchart of a solution B for activation/deactivation of inter-eNodeB carrier aggregation according to the present invention.

As shown in FIG. 5, a flowchart of a solution B for activation/deactivation of inter-eNodeB carrier aggregation according to the present invention is shown. The solution specifically includes the following steps:

S501: A master eNodeB sends addition information of an SCell.

The addition information of an SCell is realized by an RRC reconfiguration process. The addition information of an SCell specifically includes a secondary cell index (SCellIndex), cell group information, and a physical cell identifier and downlink carrier frequency of the secondary cell.

The cell group information indicates whether the SCell corresponding to the current SCellIndex is from a master cell group or master eNodeB, or, from a secondary cell group or secondary eNodeB. For example, in the addition information of an SCell, an enumerated CellGroupID (CGID) information element shown as ENUMERATED{0, 1} may be added. If the CGID is 0, it is indicated that what is controlled by the macro eNodeB or called MCG; and if the CGID is 1, it is indicated that what is controlled by the small cell eNodeB or called SCG:

```
SCellToAddMod-r12 ::=   SEQUENCE {
    sCellIndex-r12          SCellIndex-r12,
    CellGroupID             ENUMERATED {0, 1}
    cellIdentification-r12  SEQUENCE {
        physCellId-r12          PhysCellId,
        dl-CarrierFreq-r12      ARFCN-ValueEUTRA
    }                                            OPTIONAL,  -- Cond SCellAdd
}
```

After receiving the addition information of an SCell, the UE maintains and updates a correspondence between the SCellIndex and the cell group.

The maintenance mode of the correspondence between the SCellIndex and the cell group may be determined by implementation.

S502: The master eNodeB or secondary eNodeB sends control information of the MAC CE to the UE.

S503: After receiving an MAC CE for activation/deactivation from the master eNodeB or the secondary eNodeB, the UE reads a corresponding bit position in the MAC CE according to the mapping relation between the cell group controlled by the maintained eNodeB and the SCellIndex.

Figure 1:
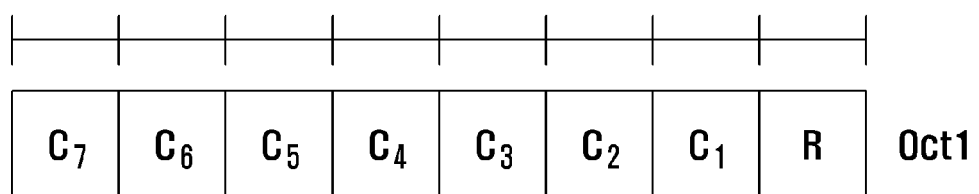
FIG. 1 is a schematic diagram of the format of an MAC CE for quick activation and deactivation of a secondary cell.
Figure 2:
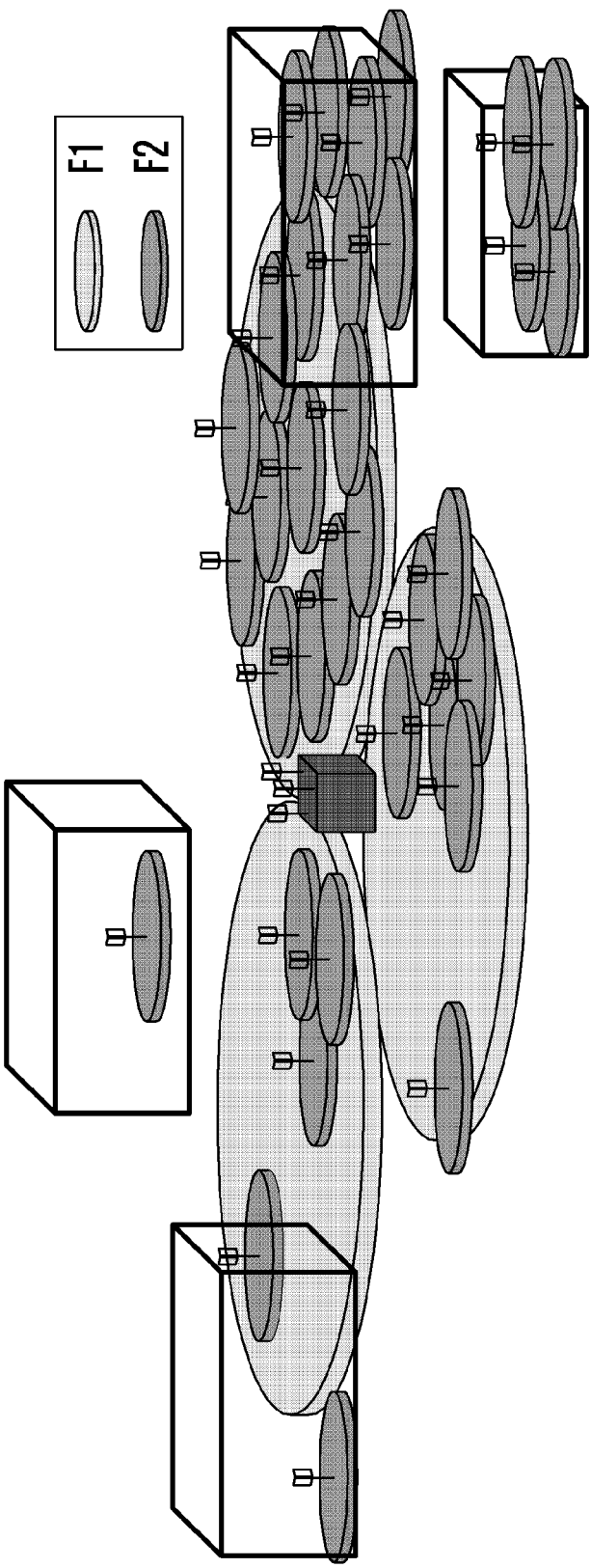
FIG. 2 is a schematic diagram of a scenario deployment of small cell enhancement in 3GPP Release 12.

If it is assumed that the SCellIndex list of a subordinate SCell of the eNodeB S is {m, n, ... }, as shown in FIG. 1, and the corresponding bit position is {Cm, Cn, ... }, the UE reads the corresponding bit position "Cm, Cn, ... " only, and then performs corresponding activation/deactivation operation.

S504: The UE activates/deactivates the corresponding SCell according to the indication of the read bit position.

Specifically, the UE activates/deactivates SCells having indexes of {m, n, ... } according to the indication of {Cm, Cn, ... }, respectively.

As an embodiment of the present invention, the indication information in the MAC CE for activation/deactivation is made correspond to all SCells controlled by the master eNodeB and the secondary eNodeB, and the corresponding SCell is determined according to the correspondence information.

Further, the making the indication information in the MAC CE for activation/deactivation correspond to all SCells controlled by the master eNodeB and the secondary eNodeB includes:

before sending an MAC CE for activation/deactivation of an SCell, communicating the master eNodeB with the secondary eNodeB to acquire activation/deactivation information of SCells controlled by the opposite side, and recording the activation/deactivation information of all SCells controlled by the master eNodeB and the secondary eNodeB in the indication information in the MAC CE for activation/deactivation.

The above embodiment will be described as below with reference to a specific application scenario.

Application Scenario 3 (Solution C):

Introduction of this Solution

The master eNodeB and the secondary eNodeB of the UE interact the latest SCell activation/deactivation state, and the corresponding bit position of the MSC CE for activation/deactivation controlled by the opposite eNodeB may be filled according to the latest activation/deactivation state of a subordinate SCell of the opposite eNodeB, so that each bit position of the MAC CE for activation/deactivation received by the UE from any eNodeB is always effective.

In this application scenario, it is assumed that the master eNodeB needs to send an MAC CE for activation/deactivation of a certain SCell to the UE.

Figure 6:
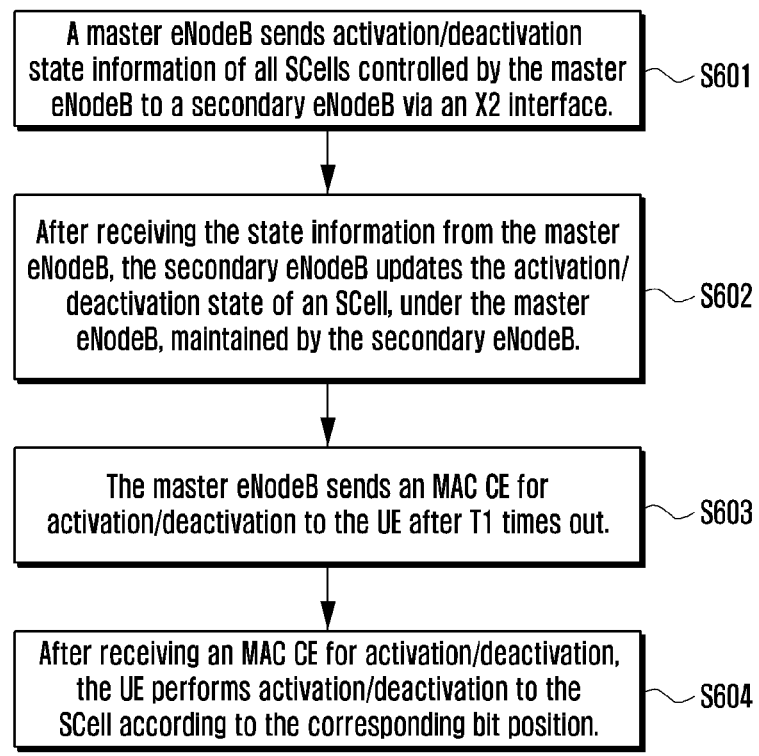
FIG. 6 is a flowchart of a solution C for activation/deactivation of inter-eNodeB carrier aggregation according to the present invention.

As shown in FIG. 6, a flowchart of a solution C for activation/deactivation of inter-eNodeB carrier aggregation according to the present invention is shown. This solution specifically includes the following steps:

S601: A master eNodeB sends activation/deactivation state information of all SCells controlled by the master eNodeB to a secondary eNodeB via the X2 interface.

In this step, the master eNodeB may start a timer T1. Here, T1 needs to be equal to or greater than the transmission delay of the X2 interface.

S602: After receiving the state information from the master eNodeB, the secondary eNodeB updates the activation/deactivation state of a subordinate SCell of the master eNodeB, maintained by the secondary eNodeB.

Here, before the secondary eNodeB issues an MAC CE for activation/deactivation, it is required to fill the corresponding bit position of a subordinate SCell of the master eNodeB according to the latest exchange information.

Step 603: The master eNodeB sends an MAC CE for activation/deactivation to the UE after T1 timing out. The sent MAC CE is a state information containing 8-bit MAC CEs of secondary cells controlled by the master eNodeB and the secondary eNodeB. The master eNodeB may send an MAC CE for activation/deactivation to the UE after T1 times out.

The timer T1 may ensure that the states of MAC CEs, respectively sent to the UE by the master eNodeB and the secondary eNodeB, of SCells controlled by the master eNodeB are consistent, when the states of SCells controlled by the master eNodeB and the secondary eNodeB change simultaneously.

Here, the bit position corresponding to a subordinate SCell of the master eNodeB needs to be filled according to the latest state information obtained by interaction with the secondary eNodeB. For example, in a case of activated state, the bit position is filled with 1; and in a case of deactivated state, the bit position is filled with 0.

For another example, in a case that the master eNodeB is in maintenance and a certain SCell under the secondary eNodeB is activated, the master eNodeB fills 1 in the bit position corresponding to the SCell; and if the SCell is deactivated, the master eNodeB fills 0 in the bit position corresponding to the SCell.

S604: After receiving an MAC CE for activation/deactivation, the UE performs activation/deactivation to the SCell according to the corresponding bit position.

Here, the corresponding bit position refers to bit positions corresponding to all SCells of the UE, including the bit positions corresponding to SCells under the master eNodeB and the bit positions corresponding to SCells under the secondary eNodeB.

In this solution, through the interaction of state information of inter-eNodeB activation/deactivation, the UE considers that the bit positions corresponding to all SCells are effective when receiving an MAC CE for activation/deactivation every time.

The above steps S601 to S604 are also applicable to a scenario where the secondary eNodeB needs to send an MAC CE for activation/deactivation of an SCell to the UE.

As an embodiment of the present invention, the UE compares MAC CEs for two successive times of activation/deactivation of an SCell from a same eNodeB, and then determines the corresponding SCell according to the change in MAC CEs for two successive times of activation/deactivation of the SCell.

Further, the change in the MAC CEs for two successive times of activation/deactivations of an SCell includes:

information about the changed bit positions in the MAC CEs for two successive times of activation/deactivations of an SCell.

The above embodiment will be described as below with reference to a specific application scenario.

Application Scenario 4 (Solution D):
Introduction of this Solution

The UE judges and maintains a correspondence between a cell group and an SCell according to the change in the bit position of the MAC CE for activation/deactivation. When receiving an MAC CE for activation/deactivation, the UE reads the bit position according to the correspondence between the maintained eNodeB and the SCell, and then performs activation/deactivation to the corresponding SCell.

Figure 7:
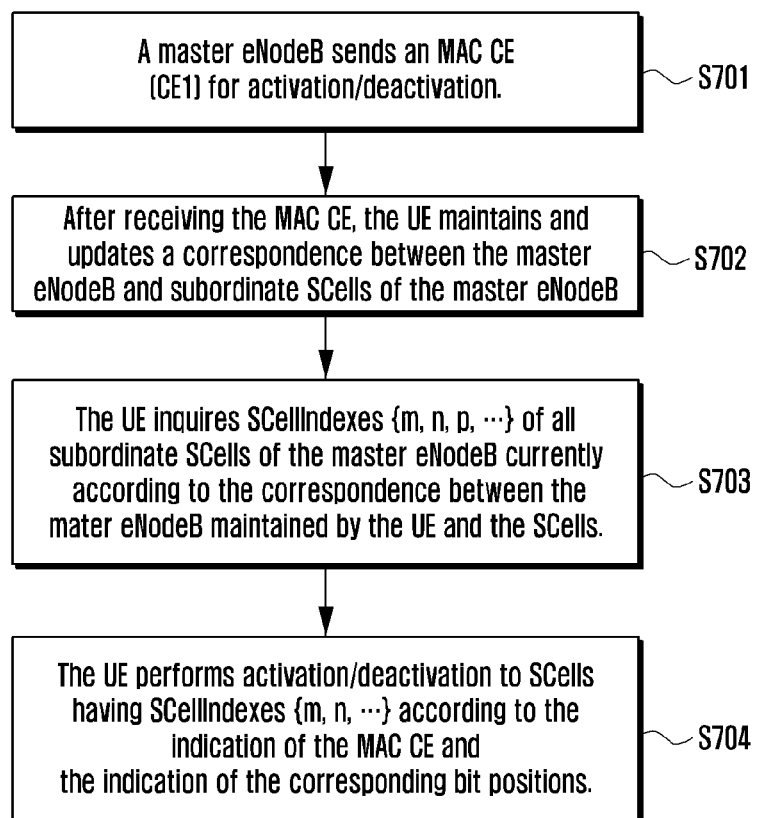
FIG. 7 is a flowchart of a solution D for activation/deactivation of inter-eNodeB carrier aggregation according to the present invention.

Further, as shown in FIG. 7, a flowchart of a solution D for activation/deactivation of inter-eNodeB carrier aggregation according to the present invention is shown. This solution specifically includes the following steps.

The description will be illustrated by taking a master eNodeB sending an MAC CE to the UE as example.

S701: A master eNodeB sends an MAC CE (CE1) for activation/deactivation.

Here, when sending an MAC CE to the UE, the master eNodeB sets a corresponding bit position controlled by this eNodeB according to practical conditions, while sets a corresponding bit position of an SCell controlled by a secondary eNodeB to be a default value, for example 0.

S702: After receiving the MAC CE, the UE maintains and updates a correspondence between the master eNodeB and subordinate SCells of the master eNodeB.

Specifically, after receiving CE1, the UE compares the CE1 with the MAC CE (CE0) previously received from the master eNodeB to find the changed bit positions {Cm, Cn, . . . }, and determines SCellIndexes corresponding to the bit positions as {m, n, . . . }, as shown in FIG. 1. Therefore, SCells having SCellIndexes {m, n, . . . } are subordinate SCells of the master eNodeB.

Further, the UE inquires correspondence between the master eNodeB maintained by the UE and SCells (assumed that Table T represents the correspondence between the master eNodeB maintained by the UE and the SCells). If a new correspondence appears, the UE should add the new correspondence into Table T.

The change in the bit position specifically means that the value of a certain bit position in CE0 is 0, while the value of this bit position in CE1 is 1; or, the value of a certain bit position in CE0 is 1, while the value of this bit position in CE1 is 0.

S703: The UE inquires SCellIndexes {m, n, p, . . . } of all subordinate SCells of the master eNodeB currently according to the correspondence between the mater eNodeB maintained by the UE and the SCells.

Specifically, the UE inquires SCellIndexes {m, n, p, . . . } of all subordinate SCells of the eNodeB S according to Table T.

S704: The UE performs activation/deactivation to SCells having SCellIndexes {m, n, . . . } according to the indication of the MAC CE and the indication of the corresponding bit positions.

The above steps S701 to S704 are also applicable to a scenario where the secondary eNodeB needs to send an MAC CE for activation/deactivation of an SCell to the UE.

S330: The UE performs activation/deactivation to the corresponding SCell according to the indication information in the MAC CE for activation/deactivation.

In the above embodiments of the present invention, the UE performs activation or deactivation to the corresponding SCell according to the indication information in the MAC CE for activation/deactivation. In the scenario of inter-eNodeB carrier aggregation, the manner of activation/deactivation during conventional carrier aggregation may be compatible, and the high misinterpretation rate caused when UE receives MAC CEs for activation/deactivation from different eNodeBs may be effectively avoided, so that the accuracy and effectiveness of activation/deactivation are ensured.

Figure 8:
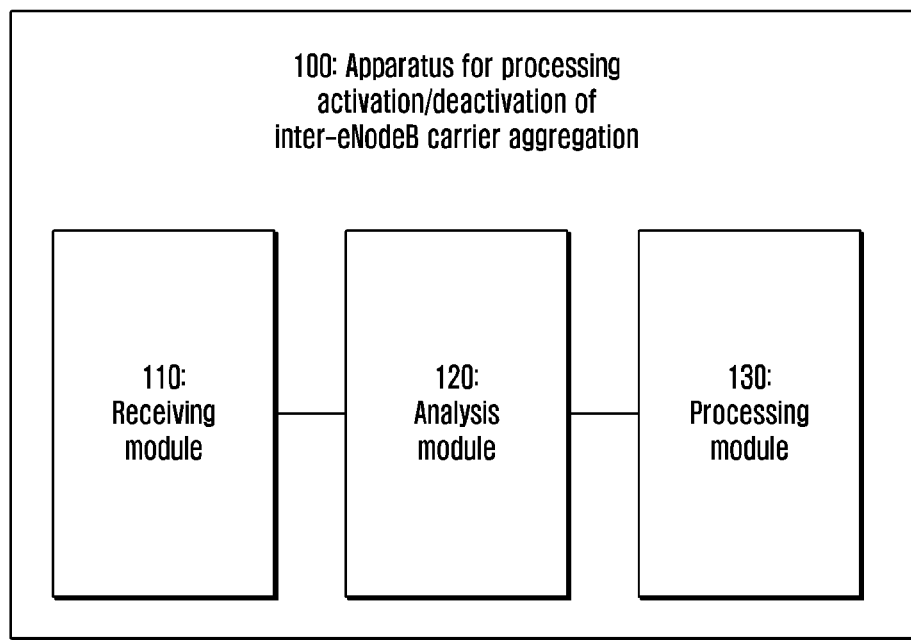
FIG. 8 is a structure diagram of an apparatus for processing activation/deactivation of inter-eNodeB carrier aggregation according to an embodiment of the present invention.

FIG. 8 is a structure diagram of an apparatus for processing activation/deactivation of inter-eNodeB carrier aggregation according to an embodiment of the present invention. As shown in FIG. 8, the apparatus 100 for processing activation/deactivation of inter-eNodeB carrier aggregation includes a receiving module 110, an analysis module 120 and a processing module 130.

The receiving module 110 is configured to receive an MAC CE for activation/deactivation of an SCell sent by a master eNodeB or a secondary eNodeB.

The analysis module 120 is configured to determine the corresponding SCell.

As an embodiment of the present invention, the analysis module 120 is configured to determine an eNodeB controlling the corresponding SCell according to the indication information in the MAC CE for activation/deactivation, and determine the corresponding SCell according to the eNodeB controlling the corresponding SCell.

Specifically, the analysis module 120 is configured to determine an eNodeB controlling the corresponding SCell according to the indication information in the MAC CE for activation/deactivation, including:

the analysis module 120 is configured to determine the eNodeB controlling the corresponding SCell according to a bit position of the indication information.

As an embodiment of the resent invention, after the receiving module 110 acquires an SCellIndex and a corresponding cell group of an SCell, the analysis module 120 is configured to determine the corresponding SCell according to the SCellIndex, the corresponding cell group and the indication information in the MAC CE for activation/deactivation.

Specifically, the receiving module 110 acquires an SCellIndex and a corresponding cell group of an SCell, including:

the receiving module 110 acquires the SCellIndex and the corresponding cell group of the SCell when receiving SCell addition information sent by the master eNodeB.

As an embodiment of the present invention, after making the indication information in the MAC CE for activation/deactivation correspond to all SCells controlled by the master eNodeB and the secondary eNodeB, the analysis module 120 is configured to determine the corresponding SCell according to the correspondence information.

Specifically, the making the indication information in the MAC CE for activation/deactivation correspond to all SCells controlled by the master eNodeB and the secondary eNodeB includes:

before sending an MAC CE for activation/deactivation of an SCell, communicating the master eNodeB with the secondary eNodeB to acquire activation/deactivation information of SCells controlled by the opposite side, and recording the activation/deactivation information of all SCells controlled by the master eNodeB and the secondary eNodeB in the indication information in the MAC CE for activation/deactivation.

As an embodiment of the present invention, the analysis module 120 is configured to compare MAC CEs for two successive times of activation/deactivation of an SCell from a same eNodeB, and then determine the corresponding SCell according to the change in MAC CEs for two successive times of activation/deactivation of the SCell.

Specifically, the change in the MAC CEs for two successive times of activation/deactivation of an SCell comprises:

information about the changed bit positions in the MAC CEs for two successive times of activation/deactivation of an SCell.

The processing module 130 is configured to perform activation/deactivation to the corresponding SCell according to the indication information in the MAC CE for activation/deactivation.

In the above embodiments of the present invention, by using the processing module 130 to perform activation or deactivation to the corresponding SCell according to the indication information in the MAC CE for activation/deactivation, in the scenario of inter-eNodeB carrier aggregation, the manner of activation/deactivation during conventional carrier aggregation may be compatible, and the high misinterpretation rate caused when UE receives MAC CEs for activation/deactivation from different eNodeBs may be effectively avoided, so that the accuracy and effectiveness of activation/deactivation are ensured.

In specific applications, the apparatus 100 provided by the present invention is typically embodied in a form of terminal equipment.

A person of ordinary skill in the art shall understand that all or a part of the steps of the methods in the foregoing embodiments may be implemented by related hardware instructed by a program. The program may be stored in a computer readable storage medium. When the program is executed, one or a combination of the steps of the methods in the embodiments is performed.

In addition, the functional units in each embodiment of the present invention may be integrated in a processing module, or may be independent from each other physically, or may be integrated into one module by two or more units. The integrated modules may be implemented in form of hardware, or may be implemented in form of software functional modules. If the integrated modules are implemented in form of software functional modules and sold or used as independent products, the integrated modules may be stored in a computer readable storage medium.

The above-mentioned storage medium may be read-only memory, magnetic disc or optical disc, etc.

The above descriptions are merely parts of embodiments of the present invention. It should be pointed out that, a person skilled in the art may make various improvements and modifications without departing from the principle of the present invention, and these improvements and modifications shall be regarded as falling into the protection scope of the present invention.

What is claimed is:

1. A method performed by a terminal in a wireless communication system, the method comprising:

receiving a first message for configuring a master cell group (MCG) secondary cell (SCell) associated with a first base station and a secondary cell group (SCG) SCell associated with a second base station, the first message including an SCellIndex for the MCG SCell and an SCellIndex for the SCG SCell;

receiving a second message for activating/deactivating at least one SCell configured for the terminal, wherein the second message includes a bitmap corresponding to the at least one SCell; and activating or deactivating an SCell based on a value of a bit from the bitmap, the bit corresponding to an SCellIndex of the SCell, wherein the SCell to be activated or deactivated is identified from the MCG SCell and the SCG SCell, the SCell being indentified based on the SCellIndex of the SCell and one of the SCellIndex for the MCG SCell or and the SCellIndex for the SCG SCell, wherein the SCellIndex for the SCG SCell does not use a same value as used for the SCellIndex for the MCG SCell.

2. The method of claim 1, wherein the first message comprises a radio resource control (RRC) message, and wherein the second message comprises a medium access control (MAC) control element (CE).

3. The method of claim 2, wherein the first base station is a master base station for the terminal and the second base station is a secondary base station for the terminal.

4. The method of claim 3, wherein the first message and the second message are received from the master base station or the secondary base station.

5. A method performed by a base station in a wireless communication system, the method comprising:

transmitting, to a terminal, a first message for configuring a master cell group (MCG) secondary cell (SCell) associated with a first base station and a secondary cell group (SCG) SCell associated with a second base station, the first message including an SCellIndex for the MCG SCell and an SCellIndex for the SCG SCell; and transmitting, to the terminal, a second message for activating/deactivating at least one SCell configured for the terminal, wherein the second message includes a bitmap corresponding to the at least one SCell, wherein an SCell is activated or deactivated by the terminal based on a value of a bit from the bitmap, the bit corresponding to an SCellIndex of the SCell, wherein the SCell to be activated or deactivated is identified from the MCG SCell and the SCG SCell, the SCell being identified based on the SCellIndex of the SCell and one of the SCellIndex for the MCG SCell or the SCellIndex for the SCG SCell, and wherein the SCellIndex for the SCG SCell does not use a same value as used for the SCellIndex for the MCG SCell.

6. The method of claim 5, wherein the first message comprises a radio resource control (RRC) message, and wherein the second message comprises a medium access control (MAC) control element (CE).

7. The method of claim 6, wherein the first base station is a master base station for the terminal and the second base station is a secondary base station for the terminal.

8. The method of claim 7, wherein the base station is the master base station or the secondary base station.

9. A terminal in a wireless communication system, the terminal comprising:
- a transceiver configured to transmit and receive a signal; and
- a controller coupled with the transceiver and configured to:
- receive a first message for configuring a master cell group (MCG) secondary cell (SCell) associated with a first base station and a secondary cell group (SCG) SCell associated with a second base station, the first message including an SCellIndex for the MCG SCell and an SCellIndex for the SCG SCell,
- receive a second message for activating/deactivating at least one SCell configured for the terminal, wherein the second message includes a bitmap corresponding to the at least one SCell, and
- activate or deactivate an SCell based on a value of a bit from the bitmap, the bit corresponding to an SCellIndex of the SCell,
- wherein the SCell to be activated or deactivated is identified from the MCG SCell and the SCG SCell, the SCell being indentified based on the SCellIndex of the SCell and one of the SCellIndex for the MCG SCell or the SCellIndex for the SCG SCell,
- wherein the SCellIndex for the SCG SCell does not use a same value as used for the SCellIndex for the MCG SCell.

10. The terminal of claim 9, wherein the first message comprises a radio resource control (RRC) message, and
- wherein the second message comprises a medium access control (MAC) control element (CE).

11. The terminal of claim 10, wherein the first base station is a master base station for the terminal and the second base station is a secondary base station for the terminal.

12. The terminal of claim 11, wherein the first message and the second message are received from the master base station or the secondary base station.

13. A base station in a wireless communication system, the base station comprising:
- a transceiver configured to transmit and receive a signal; and
- a controller coupled with the transceiver and configured to:
- transmit, to a terminal, a first message for configuring a master cell group (MCG) secondary cell (SCell) associated with a first base station and a secondary cell group (SCG) SCell associated with a second base station, the first message including an SCellIndex for the MCG SCell and an SCellIndex for the SCG SCell, and
- transmit, to the terminal, a second message for activating/deactivating at least one SCell configured for the terminal, wherein the second message includes a bitmap corresponding to the at least one SCell,
- wherein an SCell is activated or deactivated by the terminal based on a value of a bit from the bitmap, the bit corresponding to an SCellIndex of the SCell,
- wherein the SCell to be activated or deactivated is identified from the MCG SCell and the SCG SCell, the SCell being indentified based on the SCellIndex of the SCell and one of the SCellIndex for the MCG SCEll or the SCellIndex for the SCG SCell, and
- wherein the SCellIndex for the SCG SCell does not use a same value as used for the SCellIndex for the MCG SCell.

14. The base station of claim 13, wherein the first message comprises a radio resource control (RRC) message, and
- wherein the second message comprises a medium access control (MAC) control element (CE).

15. The base station of claim 14, wherein the first base station is a master base station for the terminal and the second base station is a secondary base station for the terminal.

16. The base station of claim 15, wherein the base station is the master base station or the secondary base station.

* * * * *

UNITED STATES PATENT AND TRADEMARK OFFICE
CERTIFICATE OF CORRECTION

PATENT NO. : 10,764,018 B2
APPLICATION NO. : 16/537883
DATED : September 1, 2020
INVENTOR(S) : Yu Qiu et al.

Page 1 of 1

It is certified that error appears in the above-identified patent and that said Letters Patent is hereby corrected as shown below:

On the Title Page

Column 1, between items (63) and (51), item (30) should be inserted and should read:
-- (30) Foreign Application Priority Data
January 29, 2014 (CN) ........................... 201410043678.8 --.

Signed and Sealed this
Seventeenth Day of November, 2020

Andrei Iancu
*Director of the United States Patent and Trademark Office*